Oct. 13, 1964 G. ORD 3,153,223
ARITHMETIC UNIT SEQUENCE CONTROL CIRCUIT
Filed Feb. 2, 1960
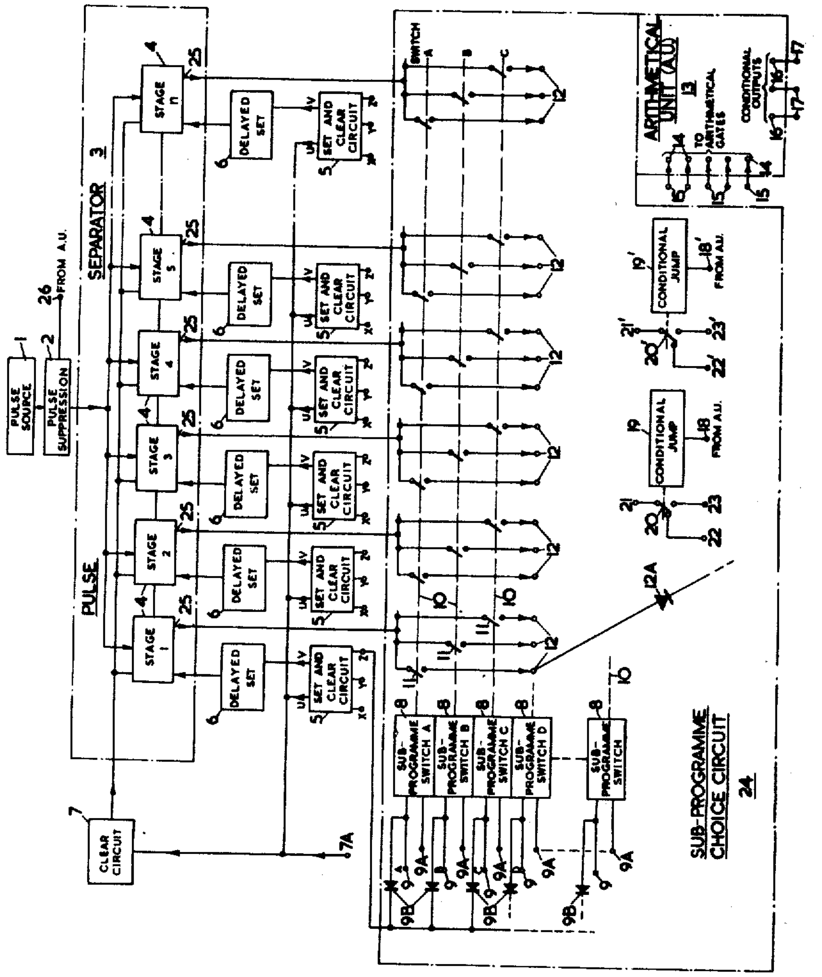
Geoffrey Ord
Inventor
By Stevens, Davis, Miller & Mosher
Attorneys

United States Patent Office 3,153,223

Patented Oct. 13, 1964

3,153,223
ARITHMETIC UNIT SEQUENCE CONTROL CIRCUIT

Geoffrey Ord, Malvern Wells, England, assignor, by mesne assignments, to International Business Machines Corporation, New York, N.Y., a corporation of New York

Filed Feb. 2, 1960, Ser. No. 6,258
Claims priority, application Great Britain Feb. 9, 1959
4 Claims. (Cl. 340—172.5)

This invention relates to electronic digital computers.

In a digital computer arithmetical operations are carried out by an arithmetical unit under the control of other parts of the computer; a given problem is solved by the computer as a whole performing the necessary arithmetical operations in the correct order in response to instructions fed into it, by means of a perforated tape for example. A set of instructions for a problem is known as a programme.

The instructions, which must be in a form the computer can understand and act upon, may consist of single, or any number of steps according to the complexity of the operation they represent. For example, consider the case when an instruction calls for the addition of two numbers stored in two registers (A and B), these numbers being of the form $x\times10^y$, ($1<x<10$, $y$ an integer) say $9.43\times10^4$ and $6.54\times10^3$. (A decimal example has been chosen but in the computer the numbers would most likely be in a binary form). It will be seen that before the addition of the $x$ parts can take place the form of the numbers must be re-arranged so that they have equal exponents and that, after the addition, if the $x$ part is computed as exceeding 10, it must be re-standardised to be in the same form as before. To carry out such an operation many separate steps are required though the instruction itself would just be "add the contents of A and B."

In one existing system, information regarding the necessary separate steps is stored in the computer itself and it must then be possible to identify these steps and bring them into use in the correct sequence. For each separate step an appropriate instruction, known as a sub-instruction, must be called up from a store; the set of sub-instructions forming a multi-step instruction is known as a sub-programme.

The sub-instructions which form sub-programmes are, in general, more detailed than the instructions of the main programme, for example they may specify a particular gate or gates to be opened in the arithmetical unit.

In one system in which sub-programmes are assembled from sub-instructions in the computer store a ferrite ring sub-store has been employed for storing the sub-instructions and the normal computer sequencing arrangements have been brought into use to apply the sub-instructions in the correct order. This system tends to be slow owing to the time the ferrite rings take to change from one magnetic storage state to the other.

In another system Wilkes et al. (Proc. I.E.E. 105, 121, March 1958) have proposed the use of a sequencer of another type. A matrix is provided consisting of columns and rows, the columns being connected, in a first section to the arithmetical unit of the computer and in a second section, via a delay circuit, to a register which is capable of applying a controlling signal to different rows of the matrix. Each row of the matrix represents a different sub-instruction (that part of a row corresponding to the first section) and the location in the matrix of the following sub-instruction (that part corresponding to the second section). Connections consisting of diodes are made between rows and columns at certain selected crossing points; these points are so chosen that a controlling signal applied by the register to a row is routed to those gates of the arithmetical unit which carry out the arithmetical part of the sub-instruction represented by the row; also, the diode connections in the second section of the matrix are chosen so that, at the same time as the arithmetical part of the sub-instruction is being provided by the first section the address, in the matrix, of the following sub-instruction is being passed to the register via the delay circuit.

In operation the register selects a row of the matrix according to the sub-instruction it is desired to use and that row (the part in the second section of the matrix) gives to the register via the delay circuit the address (i.e. the row) of the following sub-instruction; the register is then able to select the row concerned with the following sub-instruction which also gives, in its second section, the address of a further following sub-instruction, and so forth.

More elaborate arrangements have been evolved with a view to saving time because, it will be realised, the speed of operation is dependent upon the time it takes to set up the register into a new address (i.e. for selecting a new row). One arrangement provides for a second register row selection circuit. The columns of the second section of the matrix then control this second register instead of feeding into the register via the delay circuit and thus, while each arithmetic function (sub-instruction) is being carried out under the control of one register, the other register is being set up.

Substantial economies have been made by using matrices of ferrite ring cores instead of diodes. Unfortunately where high speed operation is also a requirement the use of ferrite cores generally implies a limit to the speed of operation. To revert to diodes however would reintroduce limits on speed of operation due to the stray capacity of the diodes involved in the possibly large numbers. Such stray capacity could have a severe effect using transistors of types known hitherto.

On the other hand an arrangement of this type has considerable flexibility and enables any desired sub-instruction to follow any other; in fact conditional paths may be provided by placing two-way switches (e.g. flip-flops) controlled by the computer in the connection between the path of a row in the first section of a matrix and alternative paths constituting additional rows of the second section of the matrix.

It has been appreciated, however, that some restriction over all-out flexibility can be accepted in practical sequencing arrangements; also that the encoding of a following address in the second section of the matrix and its decoding in the register can be wasteful because, after all, it still remains the same information.

It is an object of the invention to provide an alternative arrangement for controlling in sequence the arithmetical units of a computer.

According to the invention an arrangement for controlling in sequence the arithmetical units of a digital computer comprises in combination a source of pulses, a chain of latches connected to said pulse source and settable seriatim by the pulses of said source to successively energize latch output lines from said latches, means for setting a selected latch of said chain to start the successive energizing of output lines at a given output, fast operating means actuated by any energized setting means for resetting all set latches, and a plurality of means for switching the output lines of predetermined groups of latches to either an arithmetical unit of the computer or to one of the setting means whereby the operation of the arithmetical units of the computer is controlled by sequences of successive outputs of the chain of latches according to a selected scheme of connections in the switching field.

In order to make the invention clearer an embodiment thereof will now be described by way of example, reference being made to the single figure of the accompanying drawings which shows schematically an arrangement for controlling in sequence an arithmetical unit of a computer.

In the arrangement of the figure a pulse source 1 is connected via a pulse suppression circuit 2 to a chain of latches 3. The chain of latches 3 comprises a number of stages 4, numbered 1, 2, 3, 4, 5 . . . *n*. Associated with each latch stage 4 is a set and clear circuit 5 which is connected via a delayed set circuit 6 to its associated latch stage 4, and also to a clear circuit 7 which is common to all set and clear circuits 5.

In practice the pulse source 1 is a conventional pulse source having a recurrence frequency of 4 or 5 mc./s. for example. The chain of latches 3 is conveniently a shift register made up of binary stages 4 of known form and arranged to move one pulse along the register in response to input shift pulses; one practical example of such a shift register is described in my paper "High-Speed Digital-Computer Circuits Using Transistors as Bi-Directional Switches" written in conjunction with P. L. Lewis and published in the Proceedings of the I.E.E., vol. 106, Part B, Suppl. No. 16, London, 1959. FIG. 9 of that paper shows the complete circuit for a one digit-store which serves directly as a single stage 4 of the pulse separator 3. Shift In and Shift Out access points enable the stages to be connected in succession in the separator and a shift pulse input to each stage connects from the pulse supply of the pulse source 1; additional transistor input circuits at each stage provide inputs for signals to clear the register and for signals to set the register.

The basic circuits of the chain of latches are also the subject of British Patent No. 880,563.

The set and clear circuits 5 in their simplest form are merely connections providing two outputs U and V from a single input X or Z as required, the commoned outputs U each including the conventional rectifier to prevent unwanted feedback of signals on a common line. The clear circuit 7 is conveniently an amplifier to ensure that the correct form of clear signal is derived from the set and clear circuits 5 to feed to the commoned inputs of the pulse separator stages 4. The delayed set circuit 6 is again an amplifier to provide suitable set input signals but incorporating a delay line to carry out the basic function of the circuit 6 which is to delay the set signal to give the clear signal time to ensure the stage 4 is cleared.

A number of sub-programme switches 8 are each fed from connection terminals 9 and each controls a different set 10 of switched connection channels 11 from the outputs 25 of the stages 4 of the chain of latches 3. The sets 10 of channels 11 are shown as groups A, B, C and so on, each corresponding to a different switch 8, and for convenience each channel is shown as being switched by a simple make contact. Generally each group of channels 11 together with its switch 8 is embodied as a set of transistor switches. Each channel extends to a terminal 12 of a cross-connection field, thus providing switched connection channels from the chain of latches 3 which are under the control of the sub-programme switches 8.

A uni-directional path 9B from a terminal 9 feeds to an input Z of the first set and clear circuit 5. Each sub-programme switch 8 is also fed from a second input terminal 9A.

An arithmetical unit of a computer (not shown but assumed to be associated with the present arrangement) is indicated at 13 and has input terminals 14 giving access to its arithmetical gates and connected to terminals 15 in the same cross-connection field as that to which the terminals 12 belong. Output terminals 16 of the arithmetical unit 13 are connected to further terminals 17 in the cross-connection field. Terminals 18 in the cross-connection field are connected to conditional jump circuits 19, two only of which are shown for simplicity. The conditional jump circuits 19 control changeover contacts 20 which are connected between terminals 21 and terminals 22 and 23 of the cross-connection field. These circuits 19 and their contacts are generally embodied by means of transistor switches and are shown as moving contact devices merely for the convenience of a clearer understanding of their operation.

The sub-programme switches 8 and their sets of channels 11 together with the conditional jump circuits 19 serve and are collectively designated as a sub-programme choice circuit 24.

In operation, a pulse train from the pulse source 1 is fed via the pulse suppression circuit 2, which need not be considered at this stage, to the stages 4 of the chain of latches 3. A signal coming from another part of the computer of which the present arrangement forms part is applied to one of the terminals 9 to effect a choice of sub-programme A, B, C, or D . . . . The signal operates the associated sub-programme switch 8 and also proceeds via the unidirectional path 9B to the input Z of the stage 1 set and clear circuit 5 which, from an output U, activates the clear circuit 7. The clear circuit 7 resets any set stage 4 of the chain of latches 3. A signal from the output terminal V of the first stage set and clear circuit 5 passes through the delay 6 and is then applied to the set terminal of the first stage latch 4. The first pulse from source 1 then sets stage 1 to energize its output 25. Subsequent pulses from source 1 activate successive latches of the chain 3 in the usual manner. Thus the individual pulses of source 1 cause pulses to appear in succession on the individual outputs 25 of the latch stages 4 until stage *n* is reached whereupon, the circuit ceases to advance and waits for a new initiating signal to one of the circuits 5.

The outputs 25 connect to the sets of channels 11 and according to whichever sub-programme switch 8 is operated the pulses from the pulse separator outputs 25 are fed via pre-determined connection channels to an associated set of terminals 12 of the cross connection field.

In the simplest case terminals 12 are interconnected with terminals 15 in the cross-connection field via uni-directional paths typically shown at 12A so that the succession of pulses from the latch stages 4, via the predetermined connection channels to the set of terminals 12 is fed to the gates of the arithmetical unit 13 and an appropriate arithmetical function is carried out according to whichever gates are involved. Thus a signal incoming to the sub-programme choice circuit 24 initiates a sub-programme of sub-instructions which is carried out by the arithmetic unit 13 and determined by the cross-connections previously arranged between the terminals 12 and 15.

In the operation described in the previous paragraph the sequence of sub-instructions follows automatically from beginning to end of a sub-programme as the stages 4 of the latch chain 3 feed pulses successively through the connection channels to the terminals 12 and hence via the cross-connections with the terminals 15 to the gates of the arithmetic unit 13. In some cases however it is necessary to provide for a jump from one part of a sub-programme to another part of the same sub-programme. This is achieved by connecting the terminal 12 of the cross connection field corresponding to the last sub-instruction from which the jump is to be made to the set and clear circuit 5 appropriate to the sub-instruction to which the jump will occur. The appropriate terminal 12 is thus connected to an input terminal X of the required set and clear circuit 5. The set and clear circuit 5 feeds via its output terminal U to the clear circuit 7. A signal from the circuit 7 feeds into the stages 4 of the pulse separator 3 to clear the separated pulse which is in one of the outputs 25 of the stages 4. At the same time the set and clear circuit 5 feeds a signal over its other output terminal V to the delayed set circuit 6 which, after a small delay which gives time for the clear circuit to operate, feeds a setting signal into the associated stage 4 of the latch chain 3. The latch chain 3 is thus restarted at a selected new stage and continues its otuput of successive separated pulses; the sub-programme, perforce, continues from a point corresponding to the stage set by the delayed set circuit 6. Thus a jump within a sub-programme is achieved.

A jump can also be achieved into a sub-programme other than the one in operation at a particular time. This is arranged by making a cross-connection between an appropriate connection channel at its terminal 12 and an input of the set and clear circuit 5 associated with the stage of the chain of latches 3 at the desired point of commencement in the new sub-programme. The operation of the delayed set circuit 6 in this case is similar to that of the previous case so that the jumping-in point in the new sub-programme is determined. A further cross-connection from the terminal 12 is however necessary to the appropriate terminal 9A of the sub-programme choice unit 24 so that the desired sub-programme switch 8 can operate to ensure that connection channels appropriate to the required sub-programme are used.

Similarly a jump from the new sub-programme back into the old sub-programme can be easily arranged or, for that matter, a jump can be made into any other desired sub-programme and at any desired point.

Sometimes in carrying out computing operations it is required to choose a step of a sub-programme or even a step of another sub-programme accordingly as the processes carried out by the gates of the arithmetic unit 13 give one answer or another. Outputs of the arithmetic unit 13 are made available at terminals 16 of the unit 13 and can be used in the cross-connection field by way of the terminals 17 for controlling conditional cross-connections, conveniently known as conditional jump circuits. Appropriate connection is therefore made between a terminal 17 and a terminal 18 of a conditional jump circuit 19 with the result that the arithmetical unit 13 controls, according to its output, the cross-connection of a connection channel at a terminal 12; the appropriate terminal 12 is connected to a terminal 21 of the conditional jump circuit 19 in use. Cross-connections are made between the set and clear circuits 5 (and, if necessary, the sub-programme switch terminals 9 or 9A) and the conditional jump circuit output terminals 22 and 23. In operation, then, according to the output of the arithmetical unit 13, so the contact 20 of the conditional jump circuit 19 chooses one or other of the output terminals 22 and 23 and chooses one or other of two possible cross-connections.

An output terminal 16 of the arithmetical unit 13 can also provide an indication that an arithmetical process is taking longer than the time normally allowed between pulses of the pulse train from the pulse source 1 where this is known to be likely for any particular sub-instruction included in a sub-programme. An appropriate terminal 17 of the cross-connection field is connected to the pulse-suppression circuit 2 via a terminal 26. By this means pulses are prevented from entering the latch chain 3 as long as the arithmetical unit 13 indicates that a prolonged arithmetical operation is being carried out.

A good many of the sub-programmes used in a computer will naturally not contain as many sub-instructions as the latch claim has stages 4. For reasons of economy, therefore, it is desirable that where only some of the latch chain stages 4 are employed in a sub-programme the remaining stages which would otherwise be left unused should be taken up by a sub-programme having a convenient number of sub-instructions. To give economy then the unidirectional path 9B appropriate to the sub-programme to be fitted in is connected to the input terminal Z of the set and clear circuit 5 associated with the stage 4 of the latch chain 3 subsequent to the last one of the short sub-programme. The terminal 12 of the short sub-programme is cross-connected to a terminal 7A which gives access to the clear circuit 7 to clear the latch chain 3. The operation then is that, after completing one sub-programme, a new sub-programme continues, when chosen by a signal at the terminal 9 of the choice circuit 24, under the control of the remaining stages of the latch chain 3.

It will be appreciated that the sub-programme switch 8 for the new sub-programme need only provide switching control in channel 11 extending from those stages 4 which are employed in the new sub-programme.

In a typical example where 76 sub-programmes are required the two largest have 83 and 70 steps respectively whereas the average number of steps is around 10. A worthwhile economy can therefore be obtained by fitting two or possibly more sub-programmes into the successive outputs of the pulse separator.

In a typical case the pulse source 1 provides a train of pulses at a recurrence frequency of 4 to 5 mc./s.; this gives typical sub-instruction durations of 200–250 nanosecs. In addition to the advantages of simplicity and speed very good flexibility of arrangement both within, and of, the sub-programmes is obtained.

What we claim is:

1. A data processing system including an arithmetic unit having a plurality of operation controlling inputs selectively energizable to determine functions to be performed therein and a control circuit to selectively energize said inputs to enable processing of data within said arithmetic unit, said control circuit comprising a pulse source, a chain of two-state devices, each two-state device having a plurality of inputs, and an output lead energized when the device is in a set condition, a circuit connecting all said devices to said pulse source whereby each pulse of said pulse source will propagate the set condition of a two-state device to the succeeding device of said chain, a plurality of normally inactive switches for each output lead, each switch having one pole connected to its output lead, a plurality of actuators, each capable of activating one switch in each output lead, a set and clear circuit for each two-state device, said circuit being activated to cause resetting of any set two-state device and to thereafter enable setting of its associated two-state device by a pulse of said pulse source and circuits selectively connecting the remaining poles of said switches to said operation controlling inputs, to said switch actuators and to said set and clear circuits whereby each switch actuator can select at least one distinct sequence of operations in said arithmetic unit.

2. A data processing unit as in claim 1 including a common connection to the set and clear circuit for the first of said two-state devices from a plurality of said switch actuators whereby energization of one of said switch actuators will additionally reset said chain of devices and thereupon set the initial device of the chain.

3. A data processing system as set out in claim 2 including a suppression device to block transmission of pulses from said pulse source to said chain of two-state devices and a control circuit from said arithmetic unit to said suppression device whereby the chain may be arrested at any point until completion of an initiated operation in said arithmetic device.

4. A data processing system as set out in claim 1 including a plurality of multipole conditional jump switches each having its common pole connected to a pole of one of the normally inactive switches and its output poles selectively connected to said arithmetic units operation controlling inputs, to said switch actuators and to said set and clear circuits, and a conditional jump switch actuator for each conditional jump switch, each conditional jump switch actuator being connected to conditional outputs of said arithmetic unit whereby different sequencies of operation may be performed in accordance with the occurrence of different data conditions in said arithmetic unit.

References Cited in the file of this patent

UNITED STATES PATENTS

| | | |
|---|---|---|
| 2,721,990 | McNaney | Oct. 25, 1955 |
| 2,797,862 | Andrews | July 2, 1957 |
| 2,858,526 | Deutsch | Oct. 28, 1958 |
| 2,910,236 | Harper | Oct. 27, 1959 |
| 2,913,175 | Williams | Nov. 17, 1959 |
| 2,939,120 | Estrems et al. | May 31, 1960 |
| 3,042,305 | Edwards et al. | July 3, 1962 |
| 3,043,510 | Shekels | July 10, 1962 |